United States Patent [19]

Aono et al.

[11] Patent Number: 5,267,333
[45] Date of Patent: Nov. 30, 1993

[54] IMAGE COMPRESSING APPARATUS AND IMAGE CODING SYNTHESIZING METHOD

[75] Inventors: Tomoko Aono, Tenri; Hiroyuki Katata, Nara; Masaki Takakura, Higashi-Osaka; Yoji Noguchi; Noritoshi Kako, both of Nara, all of Japan

[73] Assignee: Sharp Kabushiki Kaisha, Osaka, Japan

[21] Appl. No.: 994,601

[22] Filed: Dec. 21, 1992

Related U.S. Application Data

[63] Continuation of Ser. No. 485,934, Feb. 27, 1990, abandoned.

[30] Foreign Application Priority Data

Feb. 28, 1989 [JP] Japan .................................. 1-47096
Oct. 30, 1989 [JP] Japan ................................ 1-283649

[51] Int. Cl.$^5$ ............................................. G06K 9/00
[52] U.S. Cl. ............................... 382/56; 382/42; 382/44; 358/450; 358/453; 358/464
[58] Field of Search .............. 382/56, 33, 22, 44, 382/42; 358/450, 453, 464

[56] References Cited

U.S. PATENT DOCUMENTS

| | | | |
|---|---|---|---|
| 4,316,222 | 2/1982 | Subramaniam | 358/261 |
| 4,774,500 | 9/1988 | Lichty | 341/95 |
| 4,817,050 | 3/1989 | Komatsu et al. | 364/900 |
| 4,896,208 | 1/1990 | Moriya et al. | 358/450 |
| 4,903,317 | 2/1990 | Nishihara | 358/262.1 |
| 4,922,273 | 5/1990 | Yonekawa et al. | 358/429 |
| 4,924,521 | 5/1990 | Dinan et al. | 382/56 |
| 5,046,121 | 9/1991 | Yonekawa et al. | 358/56 |
| 5,093,872 | 3/1992 | Tutt | 382/56 |

OTHER PUBLICATIONS

S. Inoue et al., Pictorial Parts Filing System of Image Synthesis IE 88-48, pp. 87-94, 1988.

*Primary Examiner*—Joseph Mancuso
*Assistant Examiner*—Yon J. Couso
*Attorney, Agent, or Firm*—David G. Conlin; Robert F. O'Connell

[57] ABSTRACT

An image compressing apparatus forms a synthetic image from a plurality of image data. The apparatus includes a device for sorting a plurality of image data into a plurality of image types in accordance with at least one of a nature and a use of each image data, a device for selecting an image compressing method out of a plurality of predetermined various image compressing methods for each image data in accordance with the sorted image type, and a device for compressing the image data in accordance with the selected image compressing method and recording the compressed image data in a recording medium.

3 Claims, 16 Drawing Sheets

SUPERPOSITION OF IMAGES

ORIGINAL

REGION INFORMATION

| 0 | 0 | 0 | 0 | 0 | 0 | 0 | 0 | 0 |
|---|---|---|---|---|---|---|---|---|
| 0 | 0 | 0 | 1 | 2 | 1 | 0 | 0 | 0 |
| 0 | 0 | 2 | 3 | 3 | 3 | 2 | 0 | 0 |
| 0 | 1 | 3 | 3 | 3 | 3 | 3 | 1 | 0 |
| 0 | 2 | 3 | 3 | 3 | 3 | 3 | 2 | 0 |
| 0 | 1 | 3 | 3 | 3 | 3 | 3 | 1 | 0 |
| 0 | 1 | 3 | 3 | 3 | 3 | 3 | 1 | 0 |
| 0 | 0 | 1 | 2 | 3 | 2 | 1 | 0 | 0 |
| 0 | 0 | 0 | 1 | 3 | 1 | 0 | 0 | 0 |
| 0 | 0 | 0 | 1 | 3 | 1 | 0 | 0 | 0 |
| 0 | 0 | 2 | 3 | 3 | 3 | 2 | 0 | 0 |
| 0 | 0 | 1 | 3 | 3 | 3 | 1 | 0 | 0 |
| 0 | 0 | 1 | 3 | 3 | 3 | 1 | 0 | 0 |
| 0 | 0 | 0 | 1 | 1 | 1 | 0 | 0 | 0 |
| 0 | 0 | 0 | 0 | 0 | 0 | 0 | 0 | 0 |

Fig. 19

CODED DATA

| LINE NO. | (CODE, LENGTH) OR (CODE) |
|---|---|
| 0 | (0,9) |
| 1 | (0,3)(1)(2)(1)(0,3) |
| 2 | (0,2)(2)(3,3)(2)(0,2) |
| 3 | (0,1)(1)(3,5)(1)(0,1) |
| 4 | (0,1)(2)(3,5)(1)(0,1) |
| 5 | (0,1)(1)(3,5)(1)(0,1) |
| 6 | (0,2)(3,5)(0,2) |
| 7 | (0,2)(1)(2)(3,1)(2)(1)(0,2) |
| 8 | (0,4)(3,1)(0,4) |
| 9 | (0,4)(3,1)(0,4) |
| 10 | (0,2)(2)(3,3)(2)(0,2) |
| 11 | (0,2)(1)(3,3)(1)(0,2) |
| 12 | (0,3)(3,3)(0,3) |
| 13 | (0,3)(1)(1)(1)(0,3) |
| 14 | (0,9) |

$\underbrace{0\ 0\ 1\ 0\ 0\ 1}_{(0,\ 9)}\ \underbrace{0\ 0\ 0\ 0\ 1\ 1}_{(0,\ 3)}\ \underbrace{0\ 1}_{(1)}\ \underbrace{1\ 0}_{(2)}\ \underbrace{0\ 1}_{(1)}\ \underbrace{0\ 0\ 0\ 0\ 1\ 1}_{(0,\ 3)}$ $\underbrace{0\ 0\ 0\ 0\ 1\ 0}_{(0,\ 2)}\ \underbrace{1\ 0}_{(2)}\ \underbrace{1\ 1\ 0\ 0\ 1\ 1}_{(3,\ 3)}\ \underbrace{1\ 0}_{(2)}\ \underbrace{0\ 0\ 0\ 0\ 1\ 0}_{(0,\ 2)}$ $\underbrace{0\ 0\ 0\ 0\ 0\ 1}_{(0,\ 1)}\ \cdots\cdots$

COLOR TOTAL BACKGROUND IMAGE

OBJECT IMAGE IN PICTORIAL PARTS

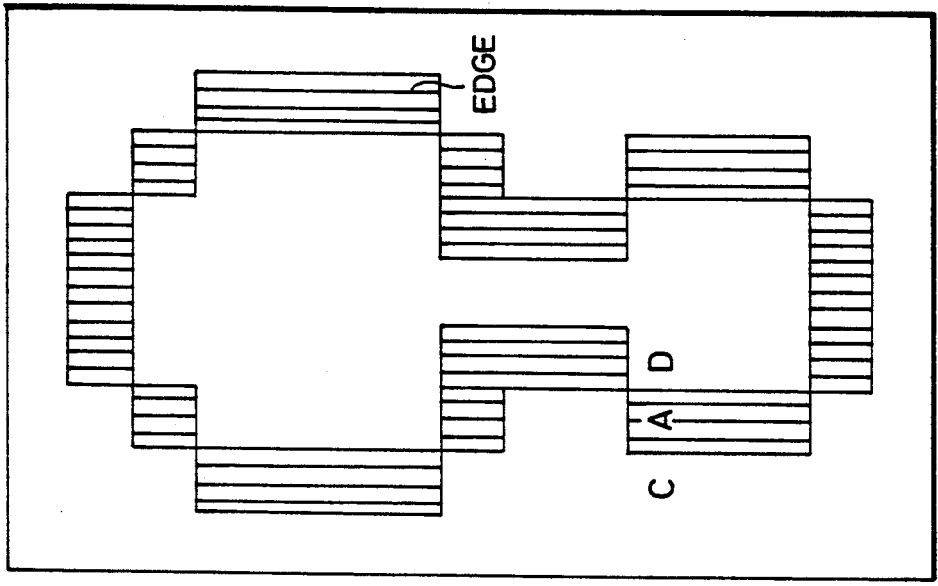
Fig. 21a SYNTHESIZING (BEFORE EDGE PROCESSING)
Fig. 21b SYNTHESIZING (BEFORE EDGE PROCESSING)

Fig. 22

DECODED IMAGE

| 200 | 200 | 50  | 50  | 50  | 50  | 50  | 10  | 50  |
|-----|-----|-----|-----|-----|-----|-----|-----|-----|
| 200 | 200 | 50  | 117 | 183 | 117 | 50  | 10  | 50  |
| 200 | 200 | 208 | 250 | 250 | 250 | 177 | 10  | 50  |
| 200 | 217 | 250 | 250 | 250 | 250 | 250 | 103 | 50  |
| 200 | 227 | 240 | 240 | 240 | 240 | 240 | 177 | 50  |
| 200 | 210 | 230 | 230 | 230 | 230 | 230 | 83  | 10  |
| 200 | 190 | 220 | 220 | 200 | 220 | 220 | 173 | 150 |
| 150 | 150 | 173 | 183 | 180 | 183 | 173 | 150 | 150 |
| 150 | 150 | 150 | 160 | 180 | 160 | 150 | 150 | 150 |
| 150 | 150 | 150 | 160 | 180 | 160 | 150 | 150 | 150 |
| 20  | 20  | 95  | 100 | 100 | 100 | 95  | 20  | 20  |
| 20  | 20  | 47  | 100 | 100 | 100 | 47  | 20  | 20  |
| 20  | 20  | 43  | 100 | 100 | 100 | 43  | 20  | 20  |
| 10  | 10  | 10  | 40  | 40  | 40  | 10  | 10  | 10  |
| 10  | 10  | 10  | 10  | 10  | 10  | 10  | 10  | 10  |

IMAGE COMPRESSING APPARATUS AND IMAGE CODING SYNTHESIZING METHOD

This is a continuation of copending application(s) Ser. No. 485,934 filed on Feb. 27, 1990, now abandoned.

BACKGROUND OF THE INVENTION

1. Field of the Invention

The present invention relates to a digital image processing technique and more particularly, to an apparatus for compressing image used in coding image data. The invention also related to an image coding and synthesizing method by use of such an image compressing apparatus.

2. Description of the Related Art

In recent years, image display devices making use of electronic means, such as large-size projectors, are becoming popular as means for synthetically displaying a plurality of image data in conferences, lecture meetings and so forth, in place of conventional display devices such as OHPs (overhead projectors), slide projectors and so forth. Such electronic display devices are finding spreading use by virtue of reduction in the costs of semiconductor devices such as memories. Usually, this type of display device employs a personal computer which forms from a plurality of image data a synthetic image which is to be displayed on a large-size screen.

The operation for forming a synthetic image from a plurality of image data by a personal computer or the like is conducted by picking-up a plurality of images such as color photos, output of a wordprocessor or the like by means of a camera, an image scanner or the like, and the picked-up images are digitized and stored in memories. Then, an editorial operation is conducted such as enlargement, contraction, cut-out, layout and so forth so that a synthetic image to be displayed is formed. The thus formed synthetic image is then recorded in a suitable recording medium such as a magnetic recording disk or a floppy disk, and is conveyed to the place where a conference or lecture meeting is to be held for presentation of the synthetic data through display.

A description will be given of the conventional method for synthesizing an image. It is assumed here that rectangular pictorial parts $P_1$, $p_2$ and $p_3$ shown in FIG. 1b are superposed to a total background image B shown in FIG. 1a so as to form a synthetic image A as shown in FIG. 1C. The following methods are available for coding, storing and reproducing this synthetic image A.

Method I: A method shown in FIG. 2a in which the whole synthetic image A is regarded as a single image, compressed and coded for recording. For reproducing, the coded data are decoded to enable display of image.

Method II: A method shown in FIG. 2b in which the total background image B and the pictorial parts $P_1$, $P_2$ and $P_3$ are independently compressed and coded for recording. For reproducing the images, the coded data are decoded and portions of the data of the total background image B corresponding to the positions of the component images $P_1$, $P_2$ and $P_3$ are replaced with the decoded data of pictorial parts $P_1$, $P_2$ and $P_3$ so that a synthetic image is formed for display.

Since such a system for synthesizing an image from a plurality of image data deals with image data itself, there rises a problem that a large amount of data should be processed. The large quantity of image data poses a problem particularly when the synthesized image is to be presented to a conference or lecture meeting. Namely, in such a case, it is preferred to use a compact recording medium and, therefore, to reduce the quantity of data. There is proposed therefore a method to reduce the quantity of data in compressing a full-color image by use of the fact that the human eyes are rather insensitive to high spatial frequency domain.

This method, however, suffers from the following problems. Namely, in some cases, the synthesis is conducted in such a manner that some pictorial parts 62 is superposed to a full-color total background image 61 and, further, a character 63 is superposed for explanation of the image, as shown in FIG. 3. If such a full-color image on which the pictorial parts and the character are superposed is compressed in the above mentioned method making use of the insensitivity of human eyes in the high spatial frequency domain, the qualities of the images of the pictorial parts and the text image are degraded when the compression is conducted at a compression ratio ordinarily used in the compression of full-color image. Conversely, a compression ratio which can eliminate such a degradation of the pictorial parts and text images is too low to achieve a convenience of compression.

It is also to be noted that presentation in a conference or a lecture meeting sometimes can be made more effective when a stress is put on a portion of the display image by changing the display of such a portion.

In the method I mentioned before, it is necessary to preserve the whole A of the synthetic image. It is therefore impossible to make common use of the data of the total background image B, as well as data of the independent pictorial parts $P_1$, $P_2$, $P_3$. Accordingly, a large storage capacity is required because the storage has to be conducted on the basis of the synthesized image A which is composed of a large quantity of data. It is also impossible to move the component images $P_1$, $P_2$, $P_3$ separately and independently on the total background image.

Furthermore, the methods I and II mentioned before suffer from the following common drawbacks. It is assumed that a pictorial parts $P_2$ having an object image $O_2$ of a chair and a component background image $b_2$ is superposed on a pictorial parts $p_1$ having an object image $O_1$ of a tree and a component background image $b_1$. There is no means for discrimination between the object images $O_1$, $O_2$ and the component background images $b_1$, $b_2$. Therefore, the synthesized image may have a drawback in that, as shown in FIG. 4, the portion of the object image $O_1$ is hidden behind the corresponding portion of the component background image $b_2$ so as to become invisible. Furthermore, when the object image $O_2$ of a chair has regions in closed loops such as $H_1$ and $H_2$, the component background image $b_2$ of the pictorial parts $P_2$ appear in these regions $H_1$, $H_2$, although the total background image B is expected to appear through these regions $H_1$, $H_2$.

Referring now to FIG. 2b, in case that the pictorial parts $P_1$, $P_2$, $P_3$ are compressed and coded according to the method II mentioned before, since the pictorial parts $P_1$, $P_2$, $P_3$ includes the component background images $b_1$, $b_2$, $b_3$ in addition to the object images $O_1$, $O_2$, $O_3$ of a tree, a frame and a chair respectively, the compression of these pictorial parts $P_1$, $P_2$, $P_3$ inevitably includes a large amount of useless information, resulting in a long computing time.

SUMMARY OF THE INVENTION

Accordingly, a first object of the present invention is to provide an image compressing apparatus for forming and displaying a synthetic image synthesized from a plurality of image data, the apparatus being capable of adopting a large compression ratio without impairing the quality of image while remarkably reducing the quantity of data used in the synthesis.

A second object of the present invention is to provide an image coding and synthesizing method which enables an image to be synthesized from a total background image and a pictorial part or from a plurality of pictorial parts in such a manner that an object image in the pictorial parts is not hidden behind the total background image and that the total background image appear through any aperture portion of the pictorial parts, while enabling pictorial parts to be handled independently and reducing the quantity of data to be compressed and, hence, the amount of computation, without causing defects such as positional offset and degradation of the image quality.

In order to achieve the first object, the present invention provides an image compressing apparatus for forming a synthetic image from a plurality of image data. The apparatus includes a device for sorting a plurality of image data into a plurality of image types in accordance with at least one of a nature and a use of each image data; a device for selecting an image compressing method out of a plurality of predetermined various image compressing methods for each image data in accordance with the sorted image type; and a device for compressing the image data in accordance with the selected image compressing method and recording the compressed image data in a recording medium.

According to the image compressing apparatus of the present invention, a plurality of image data are sorted into a plurality of image types in accordance with at least one of a nature and a use of each image data. In accordance with thus sorted image types, an image compressing method is selected for each image data. In accordance with thus selected image compressing method, the image data is compressed and recorded in a recording medium. Thus, text image, for example, can be compressed in an optimum method which is different for that of other image types. It is also possible to apply different compression methods to the compression of the total background image which is the base of the display and the pictorial parts which are variable on the total background image.

In order to achieve the second object, the present invention provides a method of coding and synthesizing an image including a pictorial part and a total background image by use of the image compressing apparatus of the present invention as described above. The method includes the steps of: sorting a plurality of image data into a pictorial part and a total background image; distinguishing an object image from a component background image in the pictorial parts and forming a region information which indicates whether each pixel in the pictorial parts belongs to the object image or the component background image; irreversibly compressing and storing a color information of each pixel of the total background image and a color information of each pixel of the object image; reversible compressing and storing the region information of each pixel of the pictorial parts; decoding the irreversibly compressed color informations and the reversibly compressed region information; and synthesizing an image, from the object image and the total background image, in accordance with the color information and the region information of each pixel of the object image and the color information of the total background image.

According to the method of the present invention, m-bit codes for example as the region information are allocated to the respective pixels for the purpose of distinguishing the object image from the component background image in a pictorial part. The compression is conducted only on the pixels of the region where the m-bit code of region information indicates that the pixels belong to the object image region, whereby the amount of data to be compressed and the time required for the calculation is greatly reduced. The region information enables discrimination between the object image and the component background image in each pictorial part. Therefore, even when two pictorial parts are superposed in such a manner that the object image of one of the pictorial parts underlies the component background image of the other pictorial parts, the underlying object image can be displayed without being hidden by the superposed component background image. It is also possible to display a total background image in aperture regions of a pictorial part superposed on the total background image. The compression of data in the region information is conducted by a reversible compression method since the human eyes has a high spatial resolution and, hence, very sensitive to positional offset. However, since human eyes are not so sensitive to colors, compression of color information is conducted usually in an irreversible manner. When two or more images are synthesized into a single image, a mis-matching may occur between the color of the object image in a pictorial part and the color of the total background image, as shown in FIG. 6. In order to prevent this problem, edge information concerning edge of the object image is added to the region information, and a color information synthesized from the color information of the total background image and the color information of the object image of the pictorial parts is given to the edge portion of the data, thereby making any mis-match of the boundary unnoticeable.

The synthetic image formed by the above-described method has smaller quantity of data so that the time required for coding and decoding can be reduced. In addition, each pictorial part can be handled independently and freely. Furthermore, any mis-matching in the boundary between the object image of a pictorial part and the total background image is eliminated so that a synthetic image of a high quality can be obtained.

In the image coding and synthesizing method of the present invention, it is preferred that the region information includes edge information representing a boundary portion between the object image of a pictorial part and the component background image, and that the color information in the boundary portion is formed on a basis of the edge information.

It is also preferred that the color information on the pixels in the above-mentioned boundary portion is interpolated by the color information of the pixels of the object image adjacent to the boundary portion and by the color information of the pixels of the total background image adjacent to the boundary portion.

These and other objects, features and advantages of the present invention will become clear from the following description of the preferred embodiments when

BRIEF DESCRIPTION OF THE DRAWINGS

FIG. 19 is an illustration of coded data of a pictorial part;

FIGS. 21a and 21b are illustrations of an edge processing method; and

FIG. 22 is an illustration of data of reproduced image.

DESCRIPTION OF THE PREFERRED EMBODIMENTS

A description will be given of an image compressing apparatus of the present invention and a system which displays a presentation image synthesized from a plurality of image data by the image compressing apparatus of the invention. This system will be referred to simply as "electronic presentation system", hereinafter.

Figure 7:
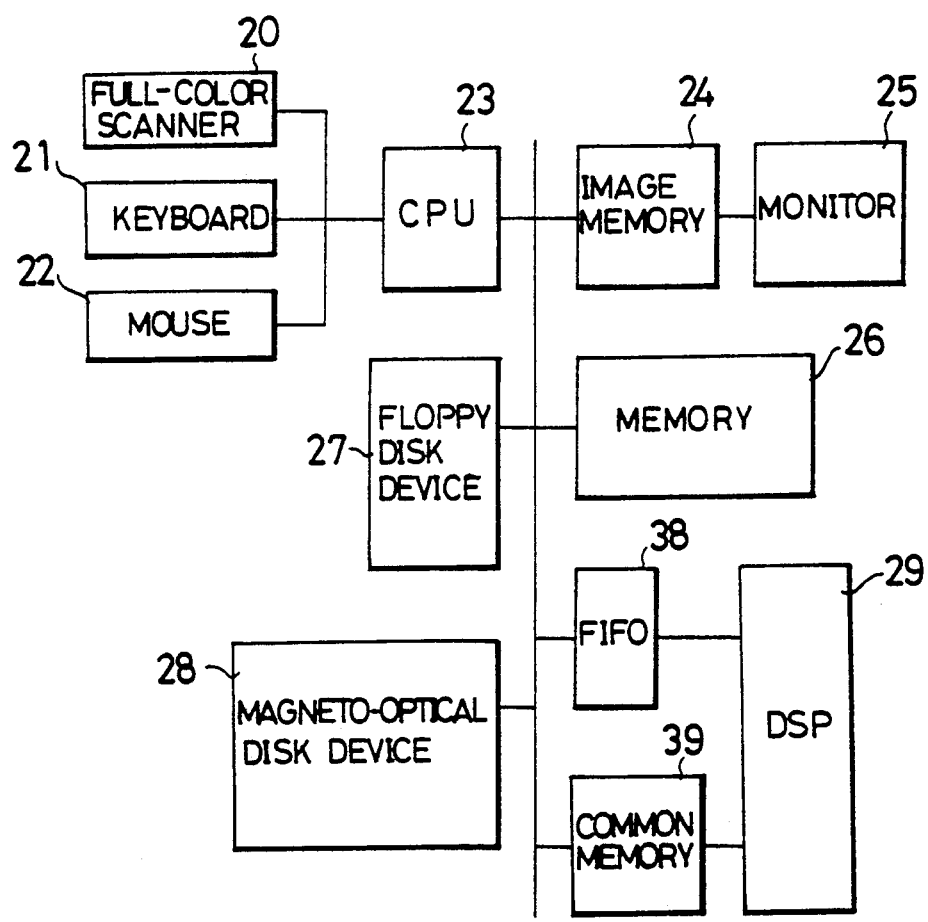
FIG. 7 is a block diagram of an apparatus embodying the invention.
Figure 8:
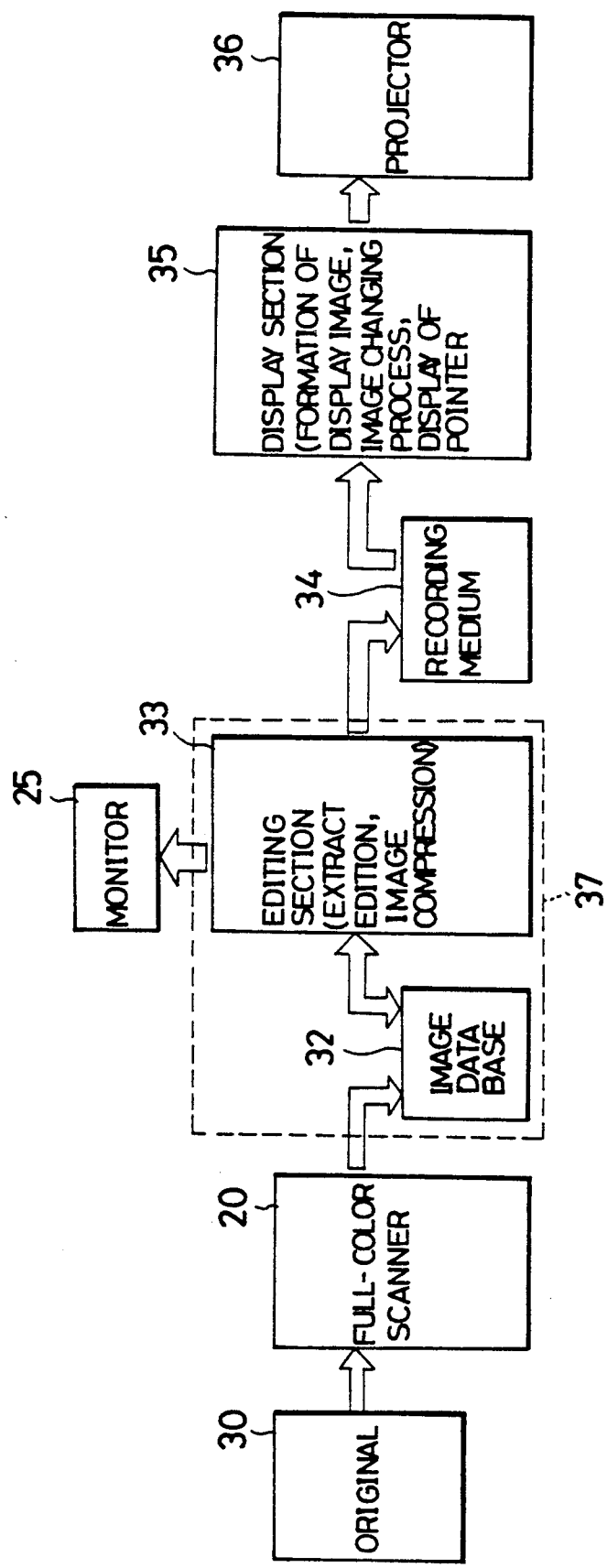
FIG. 8 is a block diagram of the flow of data in an apparatus embodying the invention.

FIG. 7 is a block diagram showing hardware of the electronic presentation system, while FIG. 8 shows the flow of data in this system.

The electronic presentation system is composed of two sections: namely, an editing section and a display section.

The display section is for displaying a presentation image in, for example, a conference, a lecture meeting or the like, and is equipped with, for example, a large-scale projector, a plurality of CRT monitors and so forth for displaying an image formed by the editing section. The display section also is possible to movably display a pointer such as a cursor, an arrow or the like on the display screen and to execute, during displaying, a display image changing operation which has been beforehand set by the editing section.

On the other hand, the editing section is for forming the image to be displayed on the display section. This section enables editing of the images to be displayed, setting of sequence of display of a plurality of images, setting of a change of an image on display, setting of switch operations for effecting such a change of image on display, and so forth. A display program including image data, image display sequence data, image changing operation data and so forth formed in the editing section is recorded in a compact recording medium such as a floppy disk which is then delivered to the display section.

The system shown in FIG. 7 incorporating an image compressing apparatus of the present invention is capable of synthesizing an image from a plurality of image data and displaying the synthesized image, thus playing both the roles of the above-mentioned editing and display sections. The system shown in FIG. 7 has a full-color scanner 20 which is capable of digitally picking up original images which include not only photographs and pictures but also characters, sentences graphs and so forth. A keyboard 21 and a mouse 22 are used for the purpose of giving instructions for various operations and inputting data such as file names. A CPU 23 is capable of commanding the operation of the whole system and has memories for storing various control programs. More specifically, an image memory 24 is capable of storing image data to be displayed on a monitor 25. This memory has a storage capacity large enough to store data corresponding to a few display picture frames. A memory 26 is capable of temporarily storing the display program formed in an editing section. A magneto-optical disk device 28 is a memory device having a large storage capacity and is used as the image data base 32 shown in FIG. 8. On the other hand, a floppy disk device denoted by 27 in FIG. 7 is used as a compact recording device and corresponds to a medium 34 shown in FIG. 8. A digital signal processor DSP 29 is capable of performing compression coding and decompression of the compressed image data. Exchange of image data and compression data between the image memory 24 and the DSP 29 is conducted through a FIFO 38 or a common memory 39 shown in FIG. 7 by means of the CPU 23. The common memory 39 is switchable between a mode in which it is accessed by the CPU 23 and a mode in which access is made from the DSP 29.

The outline of flow of the image data will be explained with reference to FIG. 8.

According to the method of the present invention, not only photographs but also characters, sentences, graphs and so forth are picked up as images. Namely, the full-color scanner 20 as image input means picks up various types of original images such as photographs, printed document, print-out of wordprocessor and so forth, and required processings such as expansion contraction, affin transformation, coloring, shading and layout processing are conducted to edit an image. More specifically, an image such as a photograph, printed document or a wordprocessor output print is picked up by the full-color scanner 20. The picked-up image is temporarily stored in an image data base 32. As explained before, the magneto-optical disk device 28 is used as the image data base 32. The operation for editing and forming an image data for presentation is conducted in the editing section 33 by conducting various editorial operations while extracting image data as required from the image data base 32 and displaying the extracted image data on the monitor 25. Thus, a component of a presentation image is formed. The presentation image component thus formed is then compressed by the image compressing apparatus of the invention and is stored again in the image data base 32. The editing section 33 then forms a display program which includes position data concerning the display position of the component, data of image changing operation and so forth, and stores the display program and the image data of the component in the recording medium 34. As stated before, the described system makes use of the floppy disk device 27 as the recording medium 34. The display device 35 receives, from the recording medium 34, the display program and the image data and forms images from these data for presentation.

Figure 9:
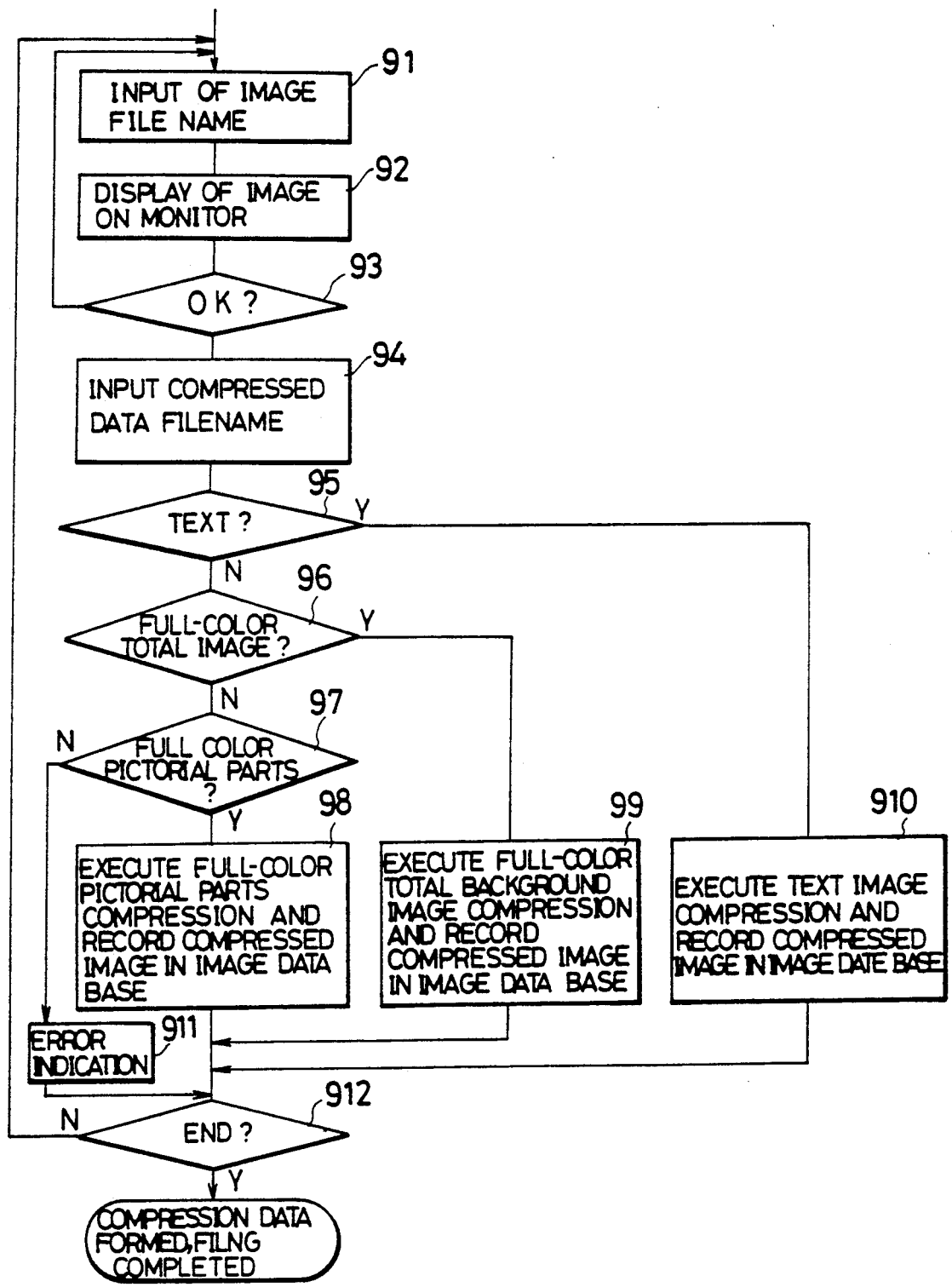
FIG. 9 is an illustration showing the flow of image data in the present invention.

A description will be given of the manner in which image data are edited, in particular compressed, as well as a method of compressing image in accordance with the present invention, with specific reference to FIGS. 9, 10 and 11.

Figure 10:
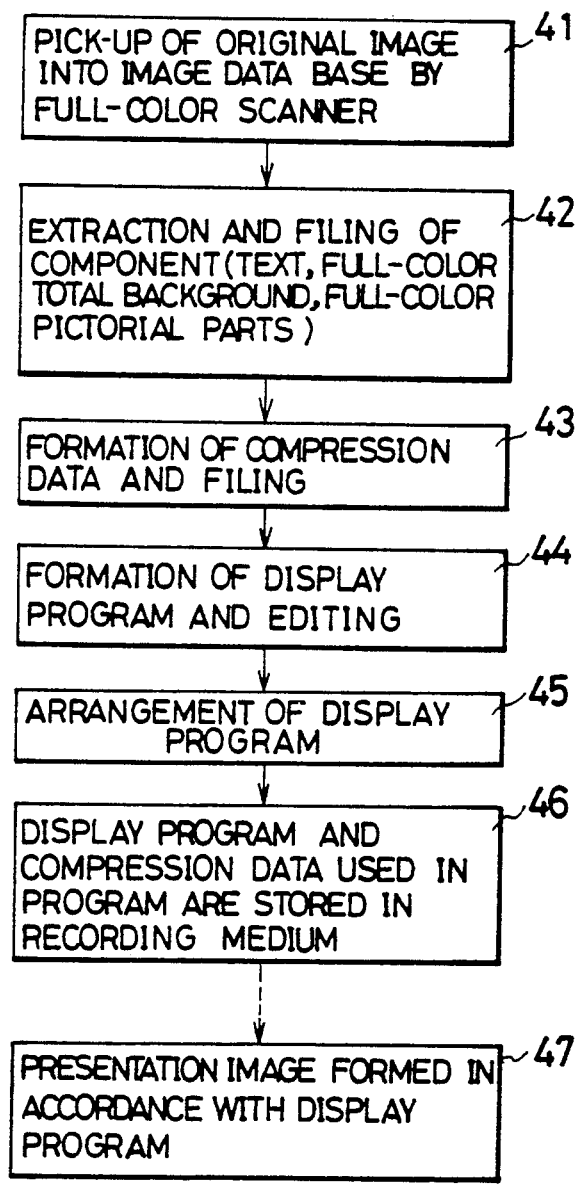
FIG. 10 is an illustration of a process for compressing an image in accordance with the present invention.
Figure 11:
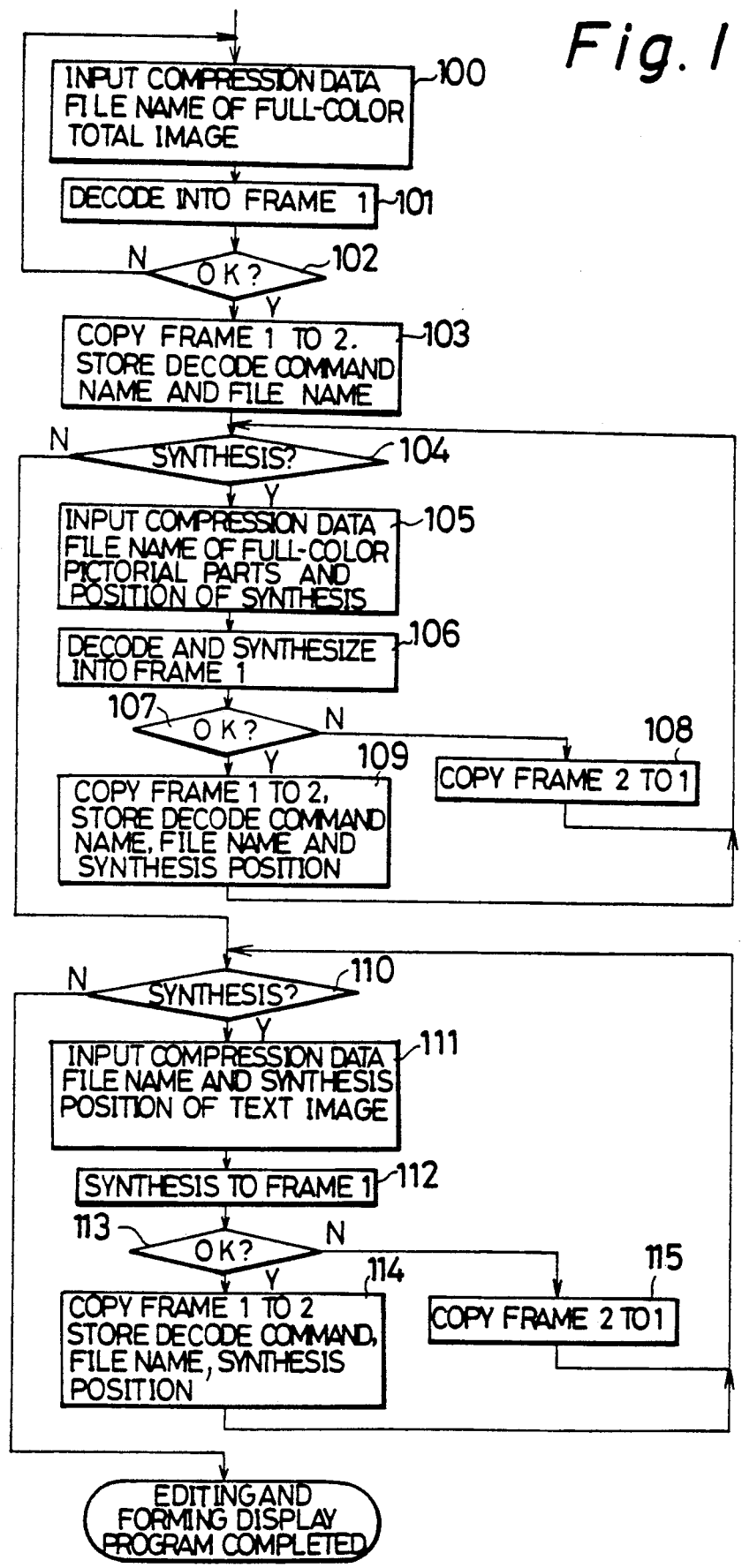
FIG. 11 is an illustration of a method for forming a display program in accordance with the invention.

FIG. 10 schematically shows the flow of the editing process. Original image is picked up by the full-color scanner 20 and is stored in a data base 32 as denoted by a step 41. In general, the full-color total image and the letter pattern images such as print output of a word-processor are input separately. Subsequently, in a step 42 the text images which are to be used as components, the full-color total image and the full-color pictorial parts are extracted and files are formed for the thus extracted images. This operation is conducted not only by searching the required images out of the images which have been separately input and stored in the image data base 32 but also by extracting out of the full-color total image pictorial parts which are to be used as pictorial parts or text images included in the full-color total image. Image data as the components thus obtained are stored again in the image data base 32 for the purpose of image compression, with suitable file names allocated thereto. Subsequently, formation of compression data and formation of files are conducted in a step 43. The detail of the operations for forming compression data and files are shown in FIG. 9. Although in this embodiment the formation of files of the respective images is temporarily conducted in advance of formation of the compression data, this is not exclusive and the compression of data may be conducted immediately after the formation of the components without forming files. In steps 91 to 93 of FIG. 9, the file name of the component, which has been filed in the step 42 of FIG. 10, is appointed through the keyboard 21 or the mouse 22 so that the image data is displayed on the monitor 25, whereby the image to be compressed is selected. Different compression file names are given to the selected components depending on the used of the components, i.e., whether the selected component is a text image, a full-color total image to be used as the background or a full-color pictorial part. More specifically, an identifier is attached to the leading or trailing end of the file name according to the type of the component. This compression data file name is input through the keyboard 21, as shown in a step 94 in FIG. 9. When the input compression data file name has an identifier indicative of a text image, the process branches from a step 95 of FIG. 9 to a step 910 in which the text image is compressed and the compressed data is recorded again in the image data base 32. When the compression data file name has an identifier indicative of a full-color total image, the process proceeds from a step 96 to 99. Similarly, when the compressed data file name has an identifier indicative of a full-color pictorial parts, the process proceeds from a step 97 to 98. In both cases, images are compressed in modes which are optimum for the natures or uses of these images and the compressed data are again stored in the image data base 32.

A description will be given hereinafter as to examples of the above-mentioned three modes of image compression.

1. Method of Compressing Text Images

This method is a compression method which is suitable for use in compressing binary or substantially binary images such as text images.

According to this method, only the luminance components are picked up and quantized. These luminance components are then classified into "object portion" (character or pattern portion), "background portion" and "halftone portion". Then, a coding is conducted by a method which is based on run length coding method. Coding of images such as a character, pattern or the like requires information concerning the shape of the character or pattern and luminance information (gray level information) for anti-aliasing, but does not necessitate information concerning the color of the original, because the color information can be separately given when the coded data are decoded. Therefore, in case of a character or pattern information, only the luminance information is compressed and coded, while the color information possessed by the original is omitted.

Then, the luminance component image is quantized into the required number of gradations. In case of an ordinary display having 500×500 pixels, quantization can be conducted with 2 to 3 bits, considering the number of gradations required in anti-aliasing. The quantization is conducted as follows. Namely, the level of the signals on the pixels of the object portion is set to minimum, while the level of the signals on the background portion is set to maximum by use of histogram processing, and the intermediate range between the maximum and minimum levels is divided into a suitable number of gradations, thus determining the quantization regions. The halftone portions are formed only on the boundary between the object portion and the background portion, thereby to exclude the halftone portions which are attributed to contamination or blur of the original.

The quantized image is then coded. The image to be coded has a distinctive feature that it has very few halftone portions.

The coding method utilizing this feature is described as following.

As the first step, the image is divided into a portion of the minimum pixel value (object portion such as later or pattern), a portion of the maximum pixel value (background portion) and other portion which is halftone portion. As to the halftone portion, the image is divided into bit planes of "1" and "0". Then, run lengths are determined for four portions: namely, the portion of the minimum pixel value, the portion of the maximum pixel value and the halftone portions of MSB values (0, 1), and these portions are changed into variable-length codes. Two-bit flags are given to the run length codes so as to enable discrimination of the classes to which the run belongs. The pixels having the minimum values, the pixels having the maximum values and the MSB bit plane information are processed by the coding mentioned up to this stage. Then, coding is conducted on bit plane information of the halftone portion other than the MSB bit plane. Namely, each such plane is respectively changed into variable length code, after determination of run length of 1 or 0. In this coding operation, only the halftone portions are collected and changed into variable length code through determination of run length, while skipping over the portions of the minimum and maximum pixel values which have already been coded. Coding into variable length code is conducted by MH coding method or MR coding method.

2. Method of Compressing Full-Color Total Images

This method is a method for compressing the whole of a full-color total image, by making use of a of a block coding method.

An image data is transform into YIQ images and each of YIQ images is compressed. Referring first to Y (luminance signal) image, this image is divided into blocks each having 4×4 pixels. The blocks are sorted into three modes according to the results of examination of states of variance of pixel values, In the mode "0" in which the variance is the smallest in the three, only the average of the pixels in the block is coded. In the mode "1" in which the variance is the second largest of the three, the average, a differential value and a bit plane are formed and coding is conducted in such a manner as to enable pixel values in the block to be represented by two representative values when decoded. In the mode "2" of the largest variance of the three, an average, a differential value and two bit planes are formed, and the coding is conducted in such a manner that the pixel values are represented by four representative values when decoded. In case of I and Q (color difference signal) images, the requirement for detailed information is less strict as compared with the case of Y information. Therefore, these I and Q images are divided into blocks of 4×4 pixels and then coded only by the mode "0" or the mode "1". In the reproduction, a filtering operation is conducted to reduce any distortion of the block.

3. Method of Compressing Full-Color Pictorial Parts

This method is a method for compressing and coding only a selected partial region of a full-color image.

A description will be given as for a rectangular region 37 defined by broken line in FIG. 8, with specific reference to FIG. 12.

Figure 12:
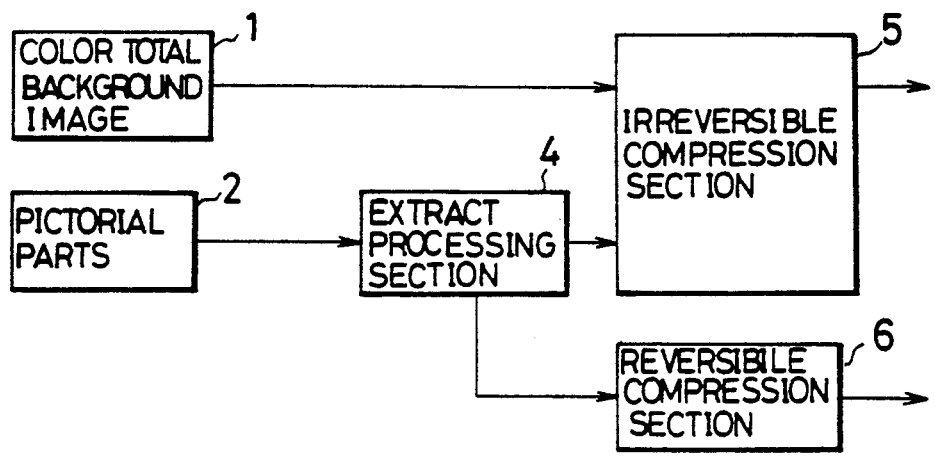
FIG. 12 is a schematic illustration of the system of the present invention.

Referring to FIG. 12, image data 1, 2, such as an original, picture or a photograph to be processes, are stored in the image data base 32 shown in FIG. 8. Numeral 4 denotes an extracted processing section which, upon receipt of a pictorial part, performs a process for separating the background image and the object image, so as to form a region information. An irreversible compression section 5 conducts compressing operation for compressing the color informations of the color total background image and the object image in the pictorial parts. A reversible compression section 6 conducts compression of the region information derived from the pictorial parts.

The extracted processing section 4, the irreversible compression section 5 and the reversible compression section 6 belong to the editing section 33 shown in FIG. 8.

Figure 13:
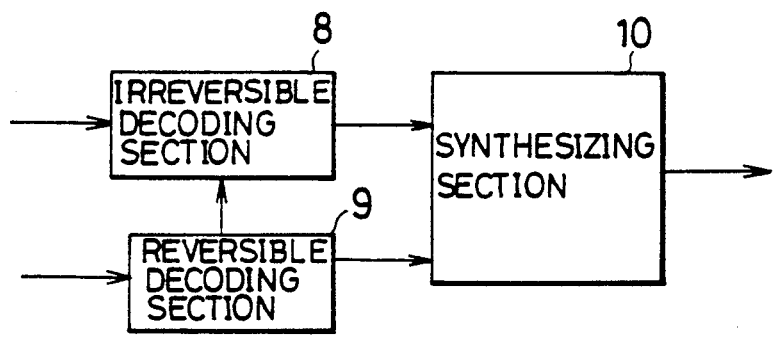
FIG. 13 is a schematic illustration of the system of the present invention.

FIG. 13 schematically shows the process for forming the display image conducted in the display section 35 shown in FIG. 8. Numeral 8 denotes an irreversible decoding processing section which decodes the color informations of the color total background image and the object image of the pictorial parts which are read from a recording-medium 34 shown in FIG. 8. Numeral 9 denotes a reversible coding processing section for decoding the region information concerning the pictorial parts. Numeral 10 designates a synthesizing processing section which conducts synthesis of the color total background image and the pictorial parts.

Operation of each section will be described in detail hereinafter.

Figure 14:
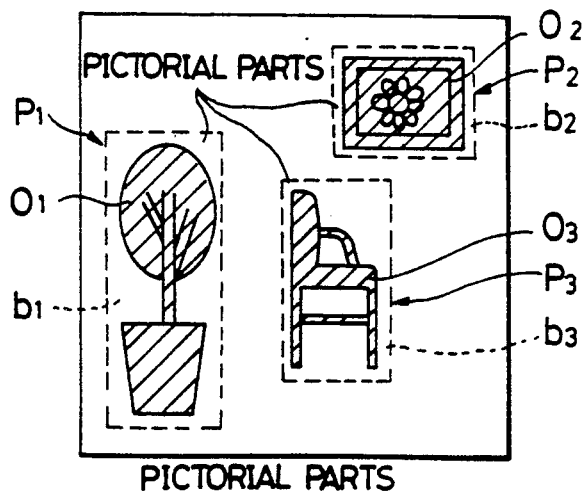
FIG. 14 is an illustration of an example of a pictorial parts.
Figure 15A:
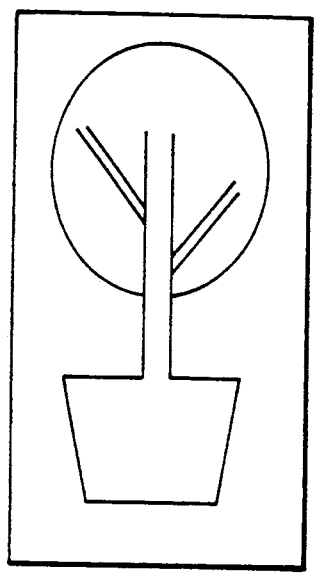
FIGS. 15a and 15b are illustrations of an original image and region information.
Figure 15B:
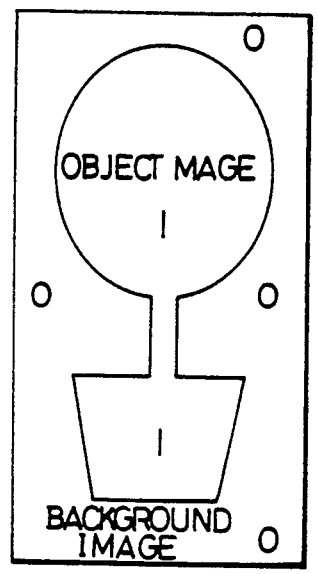
Figure 16:
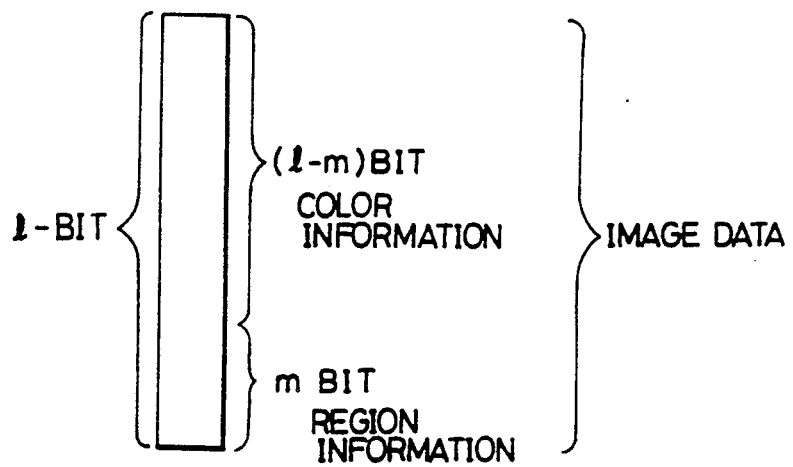
FIG. 16 is an illustration of construction of image data.

When the input image is appointed to be pictorial parts, the extracted processing section 4 conducts the separation of the object image from the component background image. Referring to FIG. 14, there are shown three pictorial parts $P_1$, $P_2$, $P_3$ which are defined by broken 1 pictorial parts $P_1$, $P_2$, $P_3$ have object images $O_1$, $O_2$, $O_3$ which are hatched and component background images $b_1$, $b_2$, $b_3$, respectively. The process to be conducted on the pictorial parts $P_1$ having an image of tree $O_1$ will be described by way of example. As shown in FIG. 15, "0" and "1" are allocated to the component background image and the object image, thus forming a region information. This process is conducted by the user who determines whether "1" or "0" is to be allocated through an interactive method. As shown in FIG. 16, the region information is stored in the lowermost m bits of the image data. Therefore, if the image data is formed by l bits per pixel, the remainder (l -m) bits are used for storing its color information. Therefore, the information read through the full-color scanner 20 is extinguished from the lowermost m bits. In general, however, human eyes are substantially insensitive to degradation caused by extinction of the lowermost 2 to 3 bits, when R, G and B informations are respectively formed of 8 bits per pixel. Thus, no problem is caused in regard to the recognition by the human eyes provided that the value m is small. The region information formed by the extracted processing section 4 is delivered to the reversible compression section 6. Human eyes generally have high spatial resolution and, hence, are highly sensitive to any offset of lines and planes, i.e., to edges. It is therefore necessary that the region information is reproduced with high accuracy. The compression of the region information, therefore, is conducted by a reversible method such as run length coding method. The color information concerning the object image in the pictorial parts and color information of the color total background image are delivered to the irreversible compression section 5. Since human eyes are generally insensitive to color information, compression of color information is conducted by an irreversible method such as GBTC (Generalized Block Truncation Coding) method, ADCT (Adaptive Discrete Cosine Transform) PCS (Progressive Coding Scheme) method, or the like. The data compressed in the irreversible compression section 5 and the reversible compression section 6 are written and stored in the recording medium 34.

Figure 17:
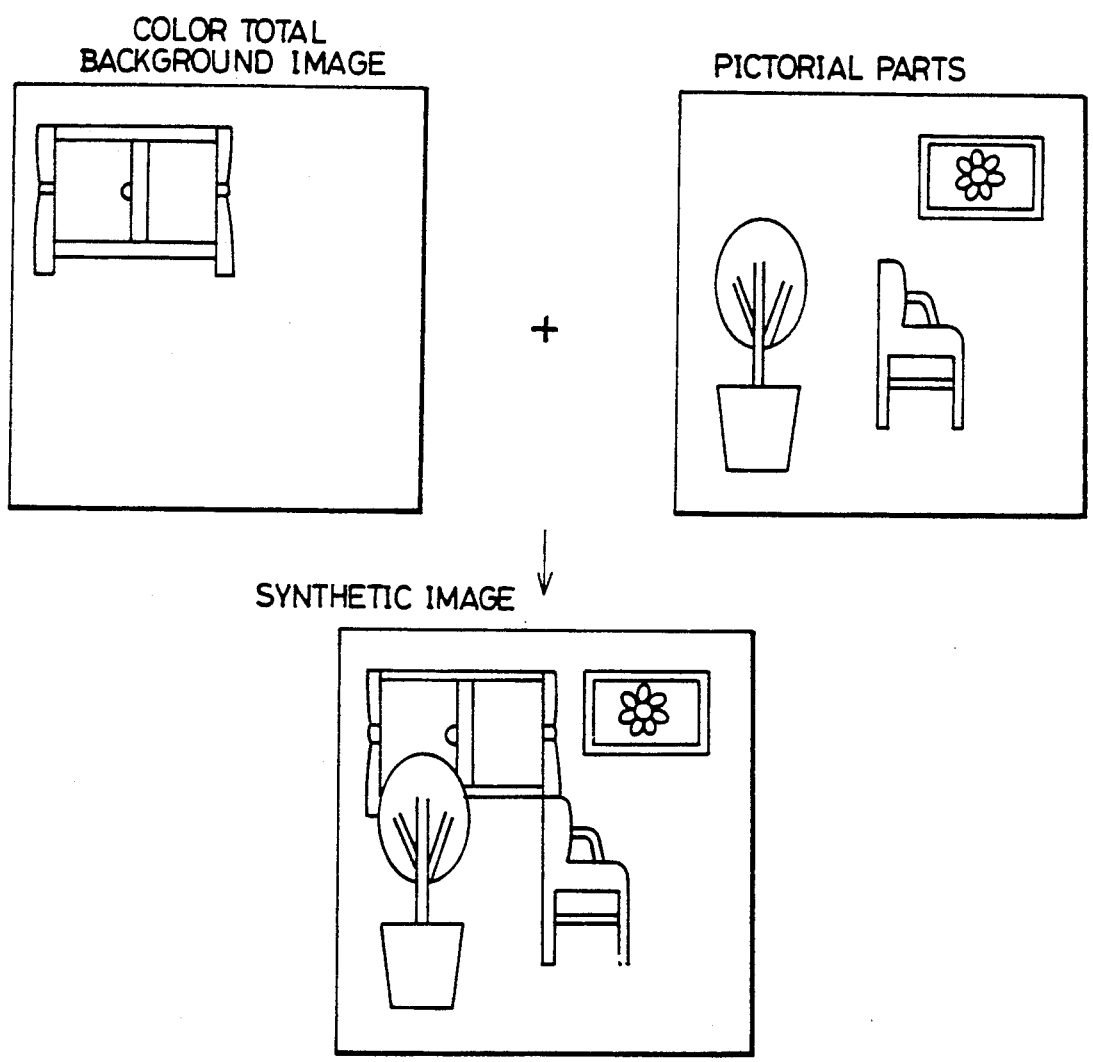
FIG. 17 is an illustration of an example of an image synthesizing process.

A description will be given of the decoding process hereinafter. The image data read from the recording medium 34 is delivered to the irreversible decompression section 8 where color information is decompressed and to the reversible decompression section 9 where the region information of the pictorial parts is decompressed. The decompressed color total background image and the decompressed pictorial parts are delivered to the synthesis processing section 10 which forms a synthetic image from the decompressed color total background image and the pictorial parts. More specifically, this operation is conducted with reference to the region information of the pictorial parts and for the regions of "0", i.e., regions which are to form the background, the color information of the color total background image is stored in the image memory of the synthesis processing section 10. However, for the regions of "1", i.e., the regions which are to form the object image, the color information of the pictorial parts is stored in the image memory. The color information thus stored in the image memory are displayed on a projector 36 as shown in FIG. 17, whereby the synthesis of image is completed. Thus, in the regions where the region information is "0", the corresponding portions of the color total images are displayed so that an image which appears to be natural to human eyes can be obtained even when a plurality of pictorial parts are superposed or when a pictorial part has "apertures".

Figure 6:
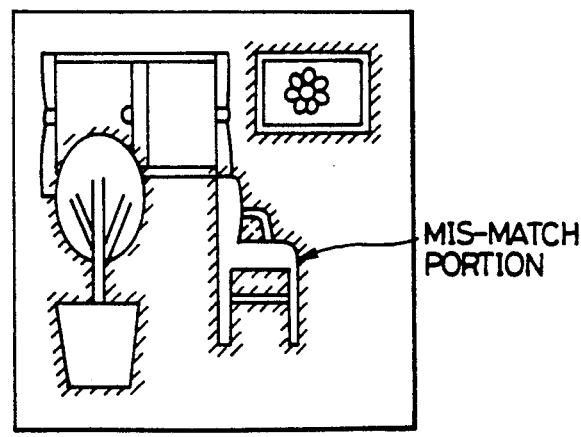
FIG. 6 is an illustration of mis-matching appearing in boundary portion between different images in a synthetic image.

However, since the region information is a binary information composed only of two levels, i.e., background level (0) and the object level (1), a mis-match of color tends to appear in the boundary between the background region and the object region, as shown in FIG. 6. In the described embodiment, therefore, edge information representing the border is added to the region information and an intermediate color obtained through interpolation between the background and the object is applied to the border portion, thus minimizing mis-match of color in the boundary edge portion. For instance, the region information is made to have four types of information: namely, background information (0), edge informations (1,2) and object information (3). The edge information (1) carries a color information of an intermediate color similar to the background, while the edge information (2) carries a color information of an intermediate color similar to the color of the object.

The above-described synthesizing process will be explained in more detail, with reference to a practical example.

Figure 1A:
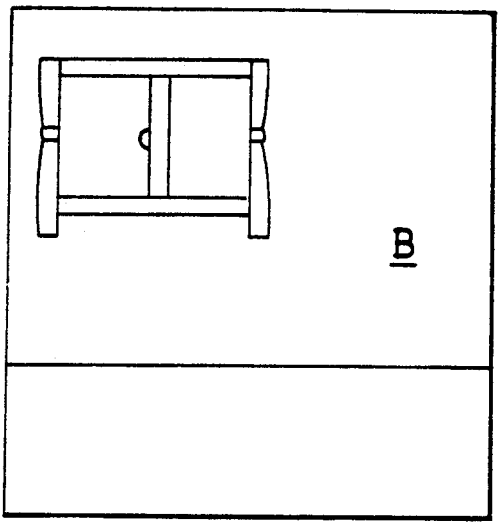
FIGS. 1a, 1b and 1c are illustrations of the manner in which a synthetic image is formed.
Figure 1B:
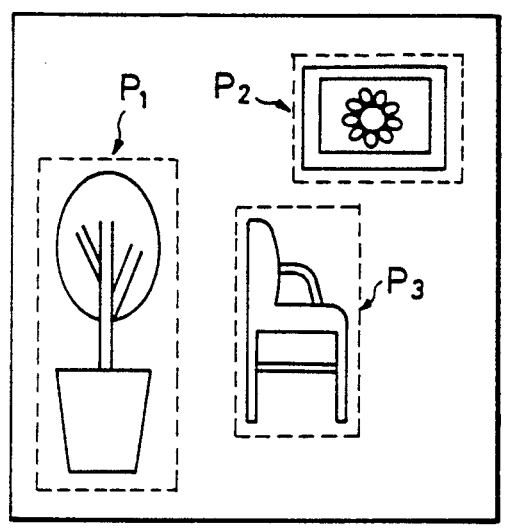
Figure 1C:
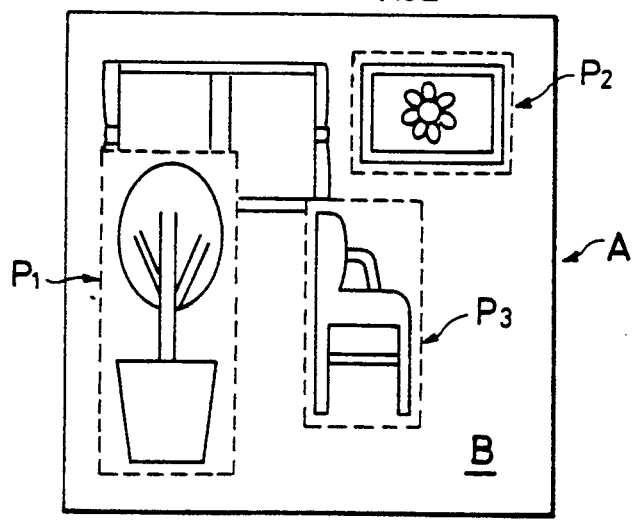
Figure 2A:
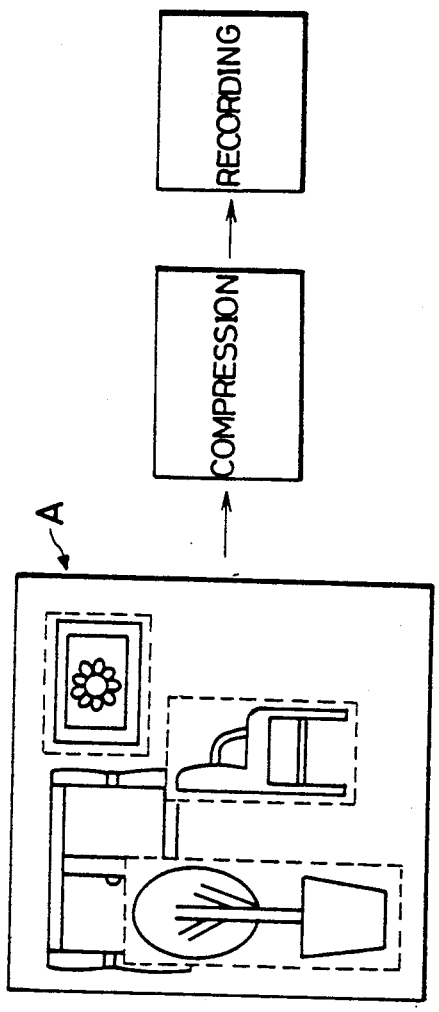
FIGS. 2a and 2b are illustrations of a method for compressing pictorial parts.
Figure 2B:
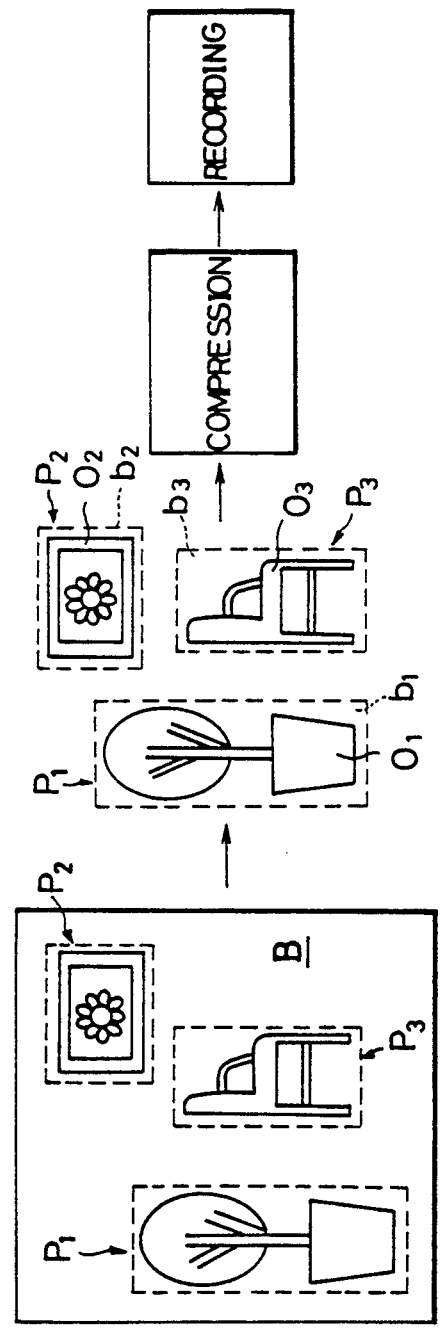
Figure 3:
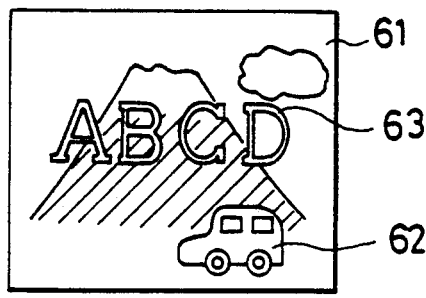
FIG. 3 is an illustration of a display for presentation.
Figure 4:
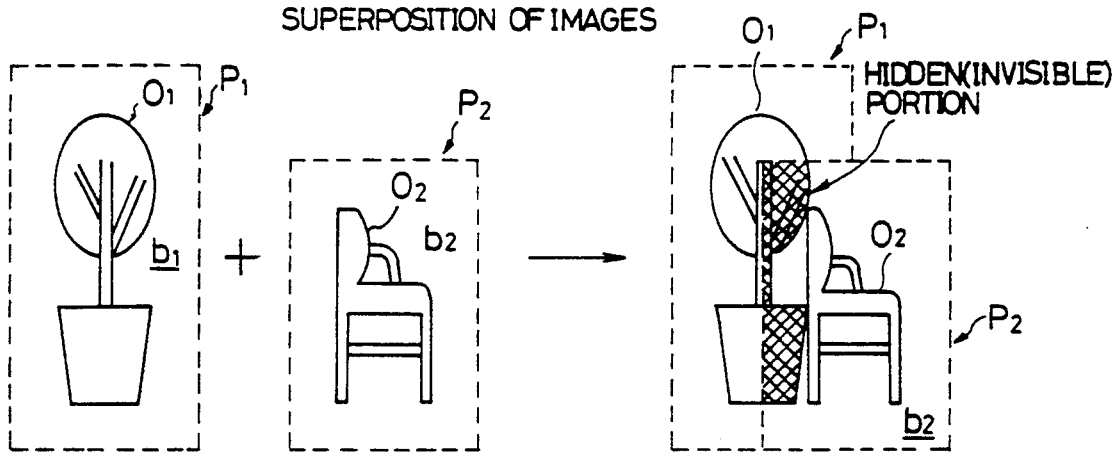
FIG. 4 is an illustration of a problem encountered in synthesis of an image.
Figure 5:
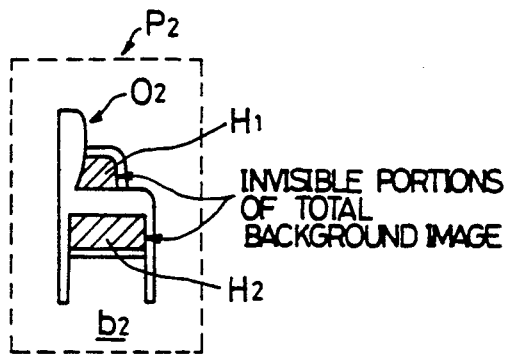
FIG. 5 is an illustration of a problem encountered in synthesis of an image.

Color values Cr, Cg and Cb of three principal color components R, G and B are picked up by the full-color scanner 20 from the color total background data (see FIG. 1a) and from the pictorial parts data (see FIG. 1b). The color signal Ci (i=r, g, b) is an 8-bit signal which can take a value between 0 and $2^8-1$. The following process is executed on the pictorial parts in the extracted processing section 4 in FIG. 12. Namely, the user conducts, in an interactive manner, an extract operation by inputting "0" for the region which the user considers the background, "3" for the region which the user considers the object image and "1" or "2" for the regions which are regarded as being edges, whereby the region information Ai (i=0 to 3, Ai being 2-bit signal) is formed. Then, the information carried by the lowermost two bits of the image data Ci (i =r, g, b) are replaced with Ai, so that upper six bits form the color information Ci'. Thus, the pictorial parts data Xi (Xi being of 8 bits) is expressed by the following formula.

$$Ci' = Ci \,\&\, FC(H)$$

where Ci' is color information concerning component image, while (H) represents a hexadecimal numeral.

$$Xi = Ci' + Ai$$

where, Ai is region information

The image data of the color total background image is compressed by an ordinary irreversible compression method such as GBTC, ADCT, VQ, PCS and so forth, and is written in a recording medium 34. In this case, however, it is necessary to raise a flag indicating whether this image is a color total background image or a pictorial parts. The pictorial parts Xi is divided into two portions: namely, the upper six bits Ci' and the lower two bits Ai. The color information Ci' is delivered to the irreversible compression section 5 where only the pixels carrying the region information "3", i.e., only the pixels of the object image, are coded. Thus, coding is not conducted on the pixels of the background and the edge. The color information Ci' of the pixel carrying the region information is "3". Therefore, the color information is shifted to the left by two bits, thus forming an 8-bit signal Ci which is then coded by irreversible compression as is the case of the color total background image data.

$$Ci' = Ci' \times 2^2$$

The region information Ai of the pictorial parts is subjected to reversible coding conducted in the reversible compression section 6. An example of such a coding operation will be described hereinunder. In case of coding of a data shown in FIG. 18a, a code of a predetermined length is given to the portion of "0" and the portion of "3" such that the same codes continue after the two-bit codes of "0" and "3". Representing the number of pixels included in the breadth of the pictorial parts by N, the above-mentioned code is a fixed-length code having a code length n expressed by the following formula.

$$n = [\log_2 N + 1] = [\log_2 9 + 1] = 4$$

The symbol [ ] represents Gauss' symbol

In case of the edge (1) or (2), a two-bit code (1) or (2) is continued as long as signal "1" or "2" lasts.

FIG. 19 shows the results of coding of the region information shown in FIG. 18.

The thus obtained coded data are written in the recording medium 34.

In this state, the color total background image and the pictorial parts are displayed not only in combination with each other but also in combination with other data which have been stored in the recording medium 34. The decompression of the color total background image is conducted as follows. Namely, data having flags indicative of color background image is read from the recording medium 34 and the thus read data are delivered to the irreversible decompression section 8, where the color total background image data are reproduced from the coded data. The image data is temporarily stored in the image memory of the synthesis section 10.

Figures 18A, 18B:
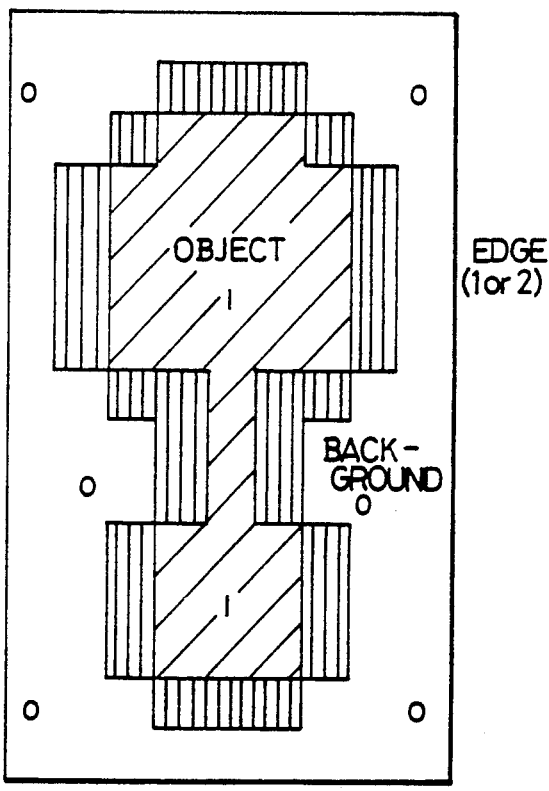
FIGS. 18a and 18b are illustrations of region information of a pictorial part.
Figure 20B:
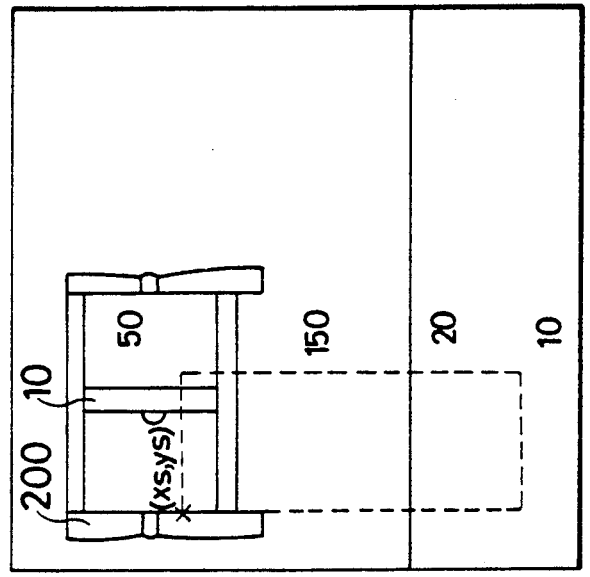
FIGS. 20a and 20b are illustrations of coded data of an image.
Figure 20A:
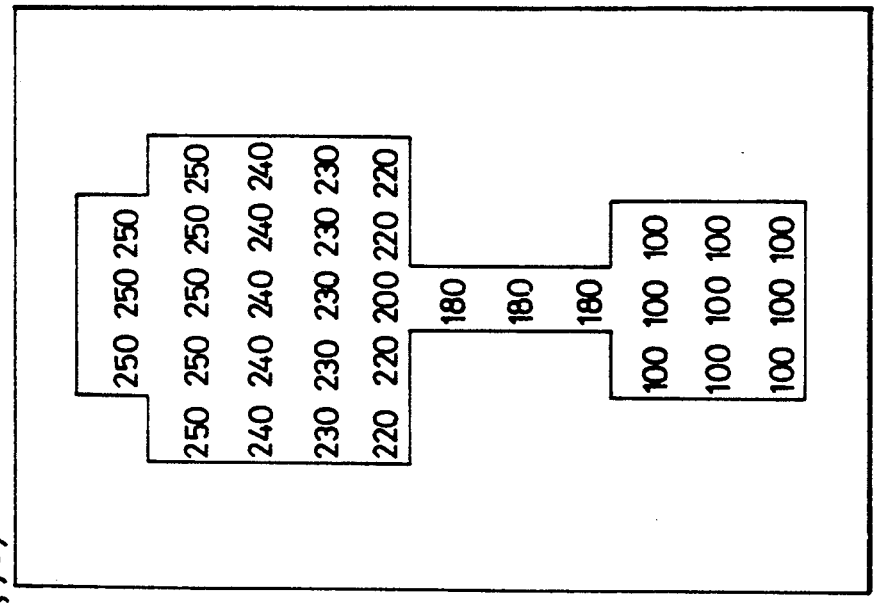

The decompression of the pictorial parts is conducted by reading data having flags indicative of the pictorial parts from the recording medium 34 and processing the read data in the reversible decompression section 9 so as to reproduce the region information of FIG. 18a. The irreversible decompression section 8 then conducts decompression of the color information of the object image in the pictorial parts, with reference to the decoded region information mentioned above. Thus, decompression of the color information of the pictorial parts is conducted only on the pixels having the region information "3", i.e., only on the pixels of the object image, whereby results are obtained as shown in FIG. 20a. The results are then stored in an image memory which is different from the image memory storing the color total background image. synthetic image from the color total background image and the pictorial parts, the user has put the start point ($x_0$, $y_0$) of the pictorial parts at an arbitrary position ($x_s$, $y_s$) (see FIG. 20b) on the color total background image. The synthesis processing section 10 then conducts a process for substituting the color information Si of the pictorial parts for the pixels Ci of the portion of the color total background image corresponding to the region information 3 (object image) of the pictorial parts. Such a substitution is not executed for the portions carrying region informations 0, 1 and 2. FIG. 21a shows in a greater scale the states of the pixels shown in FIG. 21b after the processing explained hereinbefore. An edge processing is executed subsequently. Pixels (see FIG. 21b) of the color total background image corresponding to the pixels (see FIG. 18a) of the pictorial parts having region information "1" or "2" are found as pixels of concern. Then, pixels of the total background image and the pixels of the object image which are closest to the above-mentioned pixels of concern and which have region information "0" are found out, and the values of color informations of these found pixels are determined as representative values Ti, Ti of the background and the object, respectively. When a plurality of pixels are found as the pixels closest to the pixels of concern, the average of the values carried by such plurality of closest pixels is used as the representative values Hi and Ii. The pixel value Ei of the edge is determined in accordance with the following formula from the representative values Hi and Ti.

In this formula, Z represent the region information (1 or 2) of the edge.

$$Ei = \frac{(2^m - 1 - Z)Hi + ZTi}{2^m - 1}$$

where, Z represents the region information (1 or 2) of the edge.

For instance, the value $E_A$ of the edge A shown in FIG. 21b is determined as follows. Since the pixel of the background closest to the edge A is C, the representative value HA is given as HA=20, whereas, since the pixel of the object closest to the edge A is D, the representative value TA is given as TA=100.

Therefore, the pixel value EA is given as follows.

$$EA = \frac{(3-2) \cdot 20 + 2 \cdot 100}{4 - 1} = 71$$

FIG. 22 shows the results of the determination of the pixel value on the edge. By this method, it is possible to suppress generation of mis-matching of color in the edge portion between the object and the background, thus improving the quality of the image displayed by the projector 36.

An example of compressing method has been described for each of three types of image data.

Referring back to FIG. 10, a description will now given of the display program forming process and the editing process in the step 44. The display program forming process is a process for forming a display program which includes data concerning the sequence of display of a plurality of pictorial parts, data concerning partial alteration of image on display, and so forth as shown in FIG. 11. It is assumed that the image memory 24 shown in FIG. 7 has a memory section for each of two display frames which will be referred to as "first frame" and "second frame", respectively. Firstly, the image which is to be used as the background is selected in steps 100 to 103 in FIG. 11. Subsequently, whether a pictorial parts is to be synthesized with the background image and, when a pictorial parts is to be synthesized with the background image, the name of the file and coordinates of the synthesized position, are determined in steps 104 to 109. The steps 110 to 114 determine the file of any text image to be synthesized with the synthetic images formed in the steps 100 to 109, as well as the coordinates of the position where the text image is to be synthesized with the synthetic image. In the steps 103, 109, 114, the names of the recording commands are recorded for the purpose of error correcting operations. The frame 2 is intended for storing the image before the synthesis. Editing of one presentation frame is thus conducted. Actually, the above-described process is repeated so that a plurality of frames are formed. The display program thus formed is temporarily stored in the memory 26 in FIG. 7.

In a step 45 of FIG. 10, commands for image altering process or pointer indication are added to the program formed in the step 44, whereby the display program is completed.

Finally, in a step 46, the display program and the compression data of the image used in the program are recorded in the recording medium 34. The recording medium 34 is beforehand divided into a region for storing the display program and the region for storing compressed image data, so that the display program and the image data are stored in the respective regions.

The thus obtained data for synthetic display is conveyed to the place where a conference or a lecture meeting is held and the synthetic images are sequentially displayed in accordance with the display program. More specifically, for displaying the synthetic image (the step 47 of FIG. 10), the CPU 23 reads the names of the compression data files of a plurality of images to be displayed synthetically from the display program stored in the recording medium 34. Subsequently, the CPU 23 decodes the compressed data of the respective file names in accordance with decompression methods corresponding to the methods in which these data have been compressed, and superposes these images. whereby a synthetic image is formed and displayed. These synthesizing and display operations are repeatedly conducted as the conference of the lecture meeting proceeds.

As has been described, according to the image compression apparatus of the present invention, a plurality of image data are sorted into a plurality of classes according to the attributes of the image data such as the nature, uses or the like, and are compressed by compressing modes which are optimum for the respective classes. Thus, according to the present invention, the compression is conducted in accordance with the type of the image data to be processed, e.g., whether a text image or else. It is also possible to apply different compression modes to the total image which is used as the basis of the display image and to component data which subjects to a change, so that images can be displayed synthetically without causing any degradation in the image quality.

According to the image coding and synthesizing method of the present invention, an object image is extracted from a pictorial parts so as to be separated from the component background image of this pictorial parts. Therefore, a synthetic image can be obtained from a plurality of images without causing an object image to be hidden behind the component background image of another pictorial part and in such a manner that the total background image is displayed through apertures in the object image of a pictorial part.

According to the image coding and synthesizing method of the present invention, the color informations of the pixels of the total background image and the color informations of the pixels of an object image in pictorial parts are irreversibly compressed and stored, while the region information of the pixels of the pictorial parts are reversibly compressed and stored. In consequence, the quantity of data to be compression-coded and decoded, as well as amount of computation, is remarkably reduced, while enabling production of a synthetic image of a high quality without positional off-set and substantial degradation in the image quality.

Furthermore, according to the image coding and synthesizing method of the present invention, an edge information indicating the border between an object image and the background image of a pictorial parts is included in the above-mentioned region information. The color information of pixels in the above-mentioned boundary is formed in accordance with the edge information by interpolation by the color information of pixels of the object image adjacent to the border and by the color information of pixels of the total background image adjacent to the border, whereby any mis-matching of color at the boundary does not occur.

Many widely different embodiments of the present invention may be constructed without departing from the spirit and scope of the present invention. It should be understood that the present invention is not limited to the specific embodiments described in this specification, except as defined in the appended claims.

What is claimed is:

1. An apparatus for compressing and decompressing information in an overall image to form a synthetic image from a plurality of image data, comprising:
    means for storing a plurality of image data;
    means for selecting a total background image of the overall image and a pictorial part of the overall image from the image data stored in the storing means and identifying the pictorial part as including an object image, a component background image and an edge portion image representing a boundary portion between the object image and the component background image so as to form region information which indicates whether each pixel in the pictorial part is positioned in the object image, the component background image or the edge portion image;
    the first means for irreversibly compressing and recording color information for each pixel of the total background image, the object image and the edge portion image;
    a second means for reversibly compressing and recording the region information of each pixel of the pictorial part;
    means for decompressing the compressed color information recorded in the first means and the compressed region information recorded in the second means; and
    means for interpolating the color information of each pixel of the edge portion image by the color information of the pixels of the object image adjacent to the boundary portion and by the color information of the pixels of the total background image adjacent to the boundary portion.

2. An apparatus according to claim 1, further comprising:
    means for reproducing the decompressed color information and the decompressed region information; and
    means for displaying the synthetic image based on the reproduced color information and the reproduced region information.

3. A method of decompressing and synthesizing an overall image including a pictorial part and a total background image using means for sorting image data, means for identifying a portion of each image defining the pictorial part, means for forming region information indicating a region of each pixel in the pictorial part, means for compressing an recording color information for each pixel of the overall image and the region information means for decompressing the compressed color information and the compressed region information, means for synthesizing the image, and means for interpolating the color information, comprising the steps of:
    sorting a plurality of the image data into the pictorial part and the total background image using the sorting means;
    identifying the pictorial part as including an object image, a component background image and an edge portion image representing a boundary portion between the object image and the component background image using the identifying means,
    forming the region information which indicates whether each pixel in the pictorial pat is positioned in the object image, the component background image or the edge portion image using forming means;
    irreversibly compressing and recording the color information for each pixel of the total background image, the object image and the edge portion image using the compression and recording means;
    reversibly compressing and recording the formed region information using the compressing and recording means;
    decompressing the recorded compressed color information and the recorded compressed region information using the decompressing means;
    synthesizing the image in response to the decompressed color information and the decompressed region information using the synthesizing means, and
    interpolating the color information of each pixel of the edge portion image by the color information of the pixels of the object image adjacent to the boundary portion and by the color information of the pixels of the total background image adjacent to the boundary portion using the interpolating means.

* * * * *